US008883660B2

(12) United States Patent
Goering

(10) Patent No.: US 8,883,660 B2
(45) Date of Patent: Nov. 11, 2014

(54) WOVEN PREFORM, COMPOSITE, AND METHOD OF MAKING THEREOF

(75) Inventor: Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 753 days.

(21) Appl. No.: 12/893,231

(22) Filed: Sep. 29, 2010

(65) Prior Publication Data

US 2011/0086565 A1   Apr. 14, 2011

Related U.S. Application Data

(60) Provisional application No. 61/247,777, filed on Oct. 1, 2009.

(51) Int. Cl.
| B32B 7/00 | (2006.01) |
| D03D 13/00 | (2006.01) |
| D03D 11/00 | (2006.01) |
| D03D 1/00 | (2006.01) |

(52) U.S. Cl.
USPC ........... 442/203; 442/204; 442/205; 428/119; 428/120; 156/148

(58) Field of Classification Search
USPC ........... 428/36.1, 120; 442/203–205; 156/148
See application file for complete search history.

(56) References Cited

U.S. PATENT DOCUMENTS

| 4,759,985 A | 7/1988 | Armiger et al. |
| 4,837,117 A | 6/1989 | Armiger et al. |
| 4,856,146 A | 8/1989 | Armiger et al. |
| 4,856,147 A | 8/1989 | Armiger et al. |
| 4,857,385 A | 8/1989 | Armiger et al. |
| 4,863,780 A | 9/1989 | Armiger et al. |
| 5,394,906 A | 3/1995 | Farley |
| 5,599,612 A | 2/1997 | Muraki et al. |

(Continued)

FOREIGN PATENT DOCUMENTS

| DE | 10 2008 051 121 A | 4/2010 |
| JP | 2002-003280 A | 1/2002 |

(Continued)

OTHER PUBLICATIONS

International Search Report and Written Opinion issued by European Patent Office for corresponding international application PCT/US2010/050639 dated Jan. 27, 2011.

(Continued)

*Primary Examiner* — Lynda Salvatore
(74) *Attorney, Agent, or Firm* — Frommer Lawrence & Haug LLP; Ronald R. Santucci

(57) ABSTRACT

A three dimensional woven preform, a fiber reinforced composite incorporating the preform, and methods of making thereof are disclosed. The woven preform includes two or more warp steered fabrics. The warp steered fabrics include a darted portion and an un-darted portion. The darted portions of the warp steered fabrics are joined to un-darted portions of one another so as to provide continuous fiber in the circumferential and radial directions of all portions of the preform. An un-darted portion in one steered fabric reinforces a darted portion in the other. The warp steered fabrics can be woven on a loom equipped with a differential take-up mechanism. The warp steered fabrics can be single or multilayer fabrics. The final preform can be a portion of an aircraft window frame.

14 Claims, 5 Drawing Sheets

(56) References Cited

U.S. PATENT DOCUMENTS

| | | |
|---|---|---|
| 6,446,675 B1 | 9/2002 | Goering |
| 6,477,740 B1 | 11/2002 | Hansen |
| 6,935,197 B2 | 8/2005 | Renieri et al. |
| 7,028,950 B2 | 4/2006 | Salmon et al. |
| 7,080,807 B2 | 7/2006 | Olson et al. |
| 7,118,070 B2 | 10/2006 | Abrams et al. |
| 7,175,795 B2 | 2/2007 | Eberth et al. |
| 7,281,686 B2 | 10/2007 | Wood |
| 7,300,693 B2 | 11/2007 | Albers et al. |
| 7,303,700 B2 | 12/2007 | Miller et al. |
| 7,530,531 B2 | 5/2009 | Wood et al. |
| 7,552,896 B2 | 6/2009 | Coak |
| 7,563,497 B2 | 7/2009 | Ma |
| 8,389,424 B2 * | 3/2013 | Goering et al. ............... 442/203 |
| 2005/0042410 A1 | 2/2005 | Sakonjo et al. |
| 2006/0121809 A1 | 6/2006 | Goering |
| 2008/0078876 A1 | 4/2008 | Baggette et al. |
| 2008/0169380 A1 | 7/2008 | Jackson et al. |
| 2008/0169381 A1 | 7/2008 | Ostrem et al. |
| 2009/0120573 A1 | 5/2009 | Martin |
| 2009/0162653 A1 | 6/2009 | Sakata et al. |
| 2009/0202763 A1 * | 8/2009 | Rose et al. ................... 428/36.1 |
| 2010/0285265 A1 | 11/2010 | Shinoda et al. |

FOREIGN PATENT DOCUMENTS

| | | |
|---|---|---|
| WO | WO 2005/082605 A | 9/2005 |
| WO | WO 2005/115728 A | 12/2005 |
| WO | WO 2006/086216 A | 8/2006 |
| WO | WO 2009/088029 A | 7/2009 |
| WO | WO 2009/102650 A | 8/2009 |

OTHER PUBLICATIONS

International Search Report and Written Opinion issued by European Patent Office for related international application PCT/US2010/050749 dated Jan. 27, 2011.

U.S. Appl. No. 12/893,866, filed Nov. 15, 2012, Goering et al., Non-Final Office Action

* cited by examiner

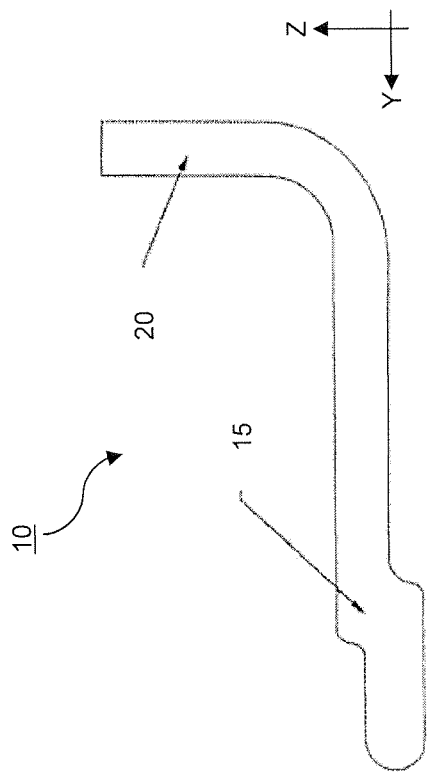
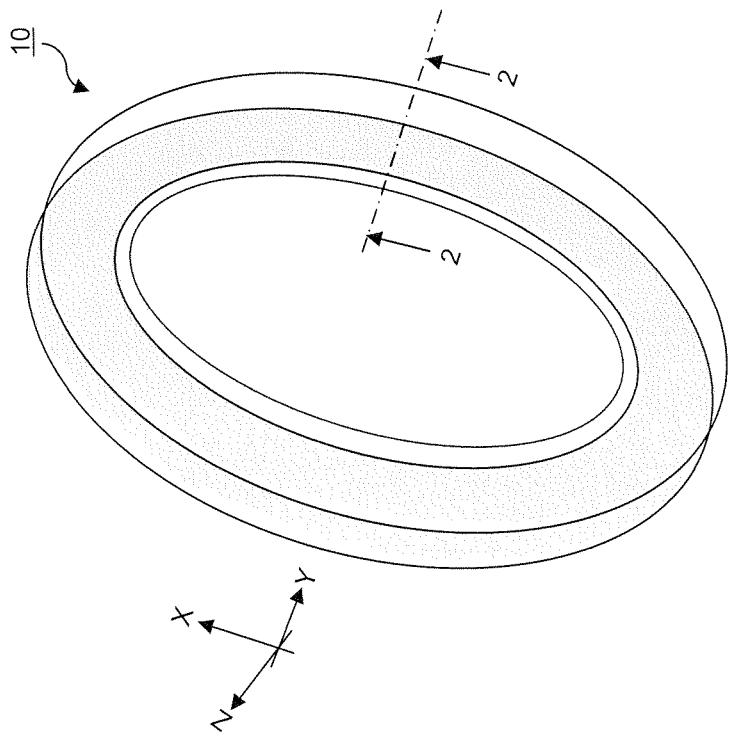

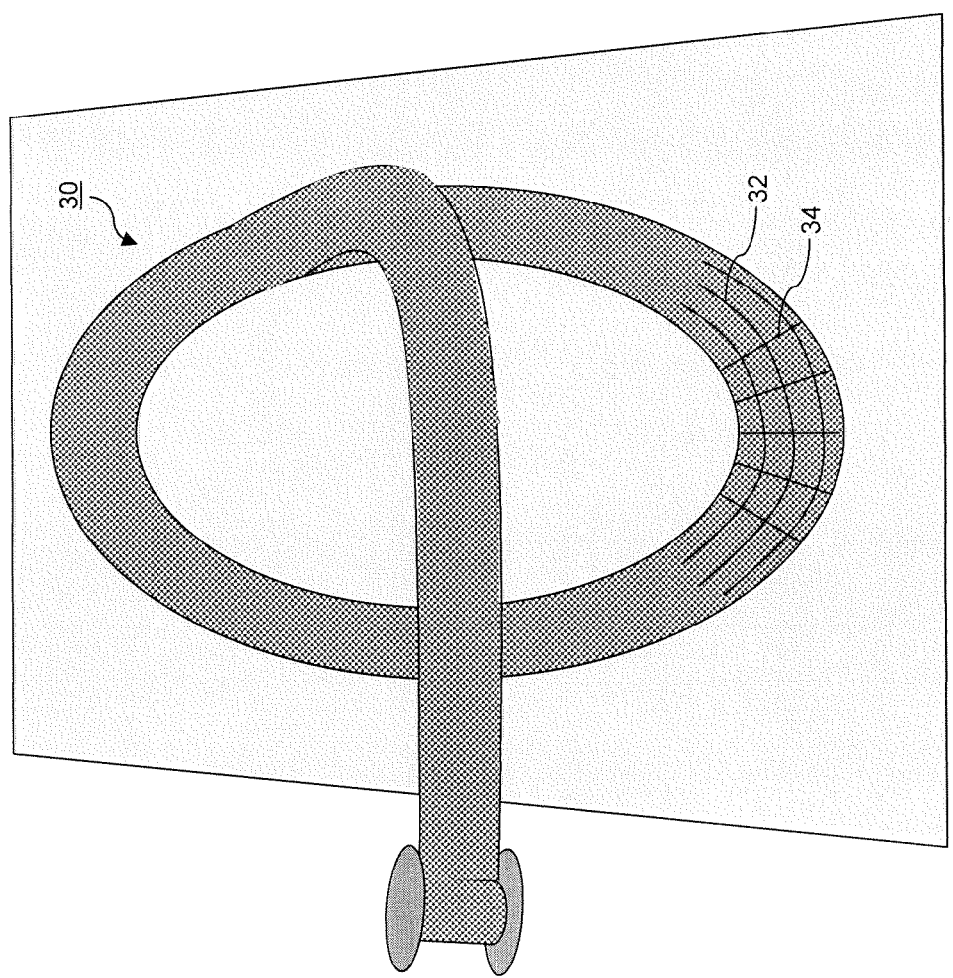

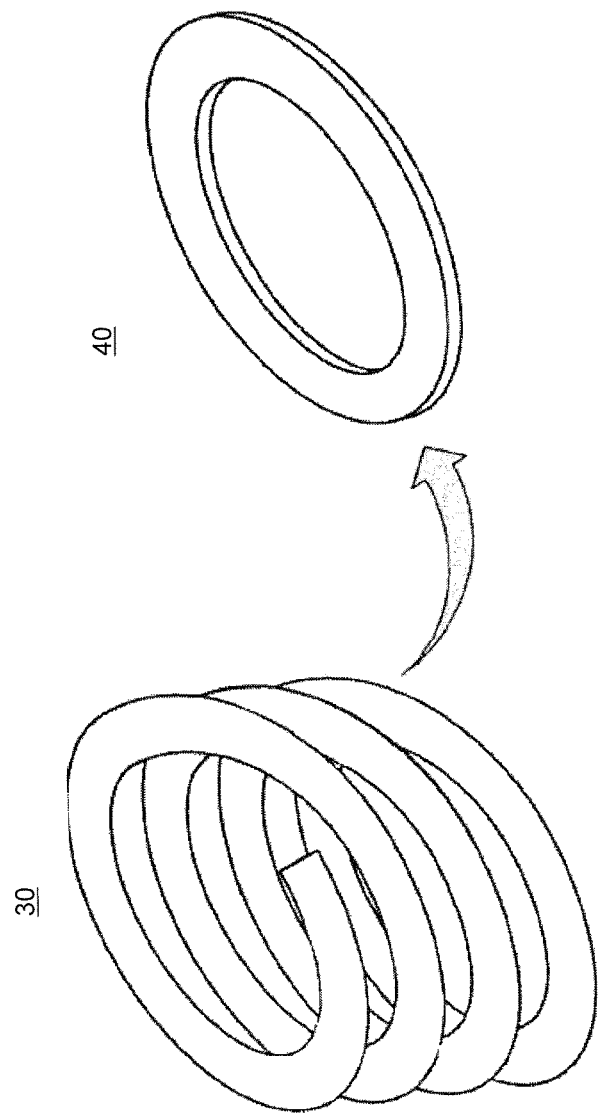

WOVEN PREFORM, COMPOSITE, AND METHOD OF MAKING THEREOF

CROSS REFERENCE TO RELATED APPLICATION

This application claims priority benefits to U.S. Provisional Patent Application No. 61/247,777 filed Oct. 1, 2009, the entire disclosure of which is incorporated herein by reference.

BACKGROUND OF THE INVENTION

1. Field of the Invention

This invention generally relates to fiber reinforced composites and particularly relates to preforms having woven strips of material used in reinforced composite materials, which can be woven flat and formed into their final shape, the final shape having reinforcement in two or more directions.

2. Incorporation by Reference

All patents, patent applications, documents, references, manufacturer's instructions, descriptions, product specifications, and product sheets for any products mentioned herein are incorporated herein by reference, and may be employed in the practice of the invention.

DESCRIPTION OF THE PRIOR ART

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and automobiles), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or braided. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix material may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

The increased use of composite materials having such fiber preform reinforcements in aircraft fuselage barrels has led to the need for composite window frames. Traditional metallic window frames cannot be used for this application because of differences between the coefficients of thermal expansion of the composite fuselage and the metallic frame. In addition, parasitic barrier plies must be used to eliminate corrosion problems that can exist when some composites and metals are in contact. These barrier plies increase cost of production as well as the overall weight.

Aircraft window frames 10, for example such as that shown in FIG. 1, tend to have the shape of an oval with the major axis of the frame curved to accommodate the cylindrical shape of the fuselage. The cross sectional shape of the window frame 10, such as that shown in FIG. 2, for example, is usually uniform. However, the shape can include complicating features such as an upstanding leg 20 at the outer edge, and/or what are called "joggles" 15 that facilitate sealing the window to the main body of the aircraft. The upstanding leg 20 is a particularly difficult feature to incorporate into a composite design because of the oval shape of the frame 10. Fabricating this feature with conventional fabric or tape requires the use of darts to form the curved shape. These darts, however, degrade the strength and stiffness of the composite if they are not reinforced.

Although this approach allows the desired shape to be formed, the reinforcing fiber will be oriented in the principal directions of a Cartesian coordinate system as seen in FIG. 3(a), rather than in the principal directions of the window frame as seen in FIG. 3(b). A typical solution to this problem is to use a so called quasi-isotropic layup of reinforcing fiber so that the preform may have uniform stiffness over the entire area of the window frame. Layups with equal proportions of fiber in the 0°, 90°, and ±45° directions are common.

This approach, however, leads to two potential problems. First, a quasi-isotropic layup only has uniform stiffness properties. The strength may not be uniform with respect to the principal window frame coordinates. Second, the stiffness of a quasi isotropic layup is reduced relative to the on-axis stiffness that can be achieved with a 0°/90° layup.

SUMMARY OF THE INVENTION

Accordingly, one object of the present invention is to have the reinforcing fiber follow the principal directions of the window frame, which are parallel to the perimeter and normal to the local radius of curvature, as shown in FIG. 3(b). This results in a preform with uniform strength and stiffness with respect to the principal coordinate system, and maximizes strength and stiffness in the principal directions of the resultant structure.

Another object of the present invention is to provide a method for fabricating a composite window frame that includes an upstanding leg, and has reinforcing fiber that follows the principal directions of the window.

Yet another object of the present invention is to provide a method of forming a three dimensional preform that has reduced weight and/or improved performance when compared to prior art designs.

The invention, according to one exemplary embodiment, is a three dimensional woven preform including two or more warp steered fabrics. The warp steered fabrics each include a darted portion and an un-darted portion. The darted portions of the warp steered fabrics are joined to the un-darted portions of one another so as to provide continuous fiber in the circumferential and radial directions of all portions of the preform. An un-darted portion in one steered fabric reinforces a darted portion in the other. A portion of the warp steered fabrics can include conventional carbon fibers and/or stretch broken carbon fibers. The warp steered fabrics can be woven on a loom equipped with a differential take-up mechanism. The warp steered fabrics can be single or multilayer fabrics. The final preform can be a portion of an aircraft window frame.

Another exemplary embodiment is a fiber reinforced composite comprising a three dimensional woven preform including two or more warp steered fabrics. The warp steered fabrics include a darted portion and an un-darted portion. The darted portions of the warp steered fabrics are joined to one another so as to provide continuous fiber in the circumferential and radial directions of all portions of the preform. An un-darted portion in one steered fabric reinforces a darted portion in the other. A portion of the warp steered fabrics can include stretch broken carbon fibers and/or conventional carbon fibers. The warp steered fabrics can be woven on a loom equipped with a differential take-up mechanism. The warp steered fabrics can be single or multilayer fabrics. The composite can be an aircraft window frame. The composite may be formed by impregnating and curing the woven preform in a matrix material.

Yet another exemplary embodiment is a method of forming a three dimensional woven preform. The method comprises the steps of weaving two or more warp steered fabrics. The method also includes darting a first portion of the warp steered fabrics, and leaving a second portion of the warp steered fabrics un-darted. The method includes joining darted portions of the warp steered fabrics so as to provide continuous fiber in the circumferential and radial directions of all portions of the preform. The method also includes reinforcing an un-darted portion in one steered fabric with a darted portion in the other. A portion of the warp steered fabrics can include stretch broken carbon fibers and/or conventional carbon fibers. The warp steered fabrics can be woven on a loom equipped with a differential take-up mechanism. The warp steered fabrics can be single or multilayer fabrics. The preform can be a portion of an aircraft window frame.

Yet another exemplary embodiment of the invention is a method of forming a fiber reinforced composite, comprising the steps of forming a three dimensional woven preform. The method comprises the steps of weaving two or more warp steered fabrics. The method also includes darting a first portion of the warp steered fabrics, and leaving a second portion of the warp steered fabrics un-darted. The method includes joining darted and un-darted portions of the warp steered fabrics so as to provide continuous fiber in the circumferential and radial directions of all portions of the preform. The method also includes reinforcing an un-darted portion in one steered fabric with a darted portion in the other. A portion of the warp steered fabrics can include conventional carbon fibers and/or stretch broken carbon fibers. The warp steered fabrics can be woven on a loom equipped with a differential take-up mechanism. The warp steered fabrics can be single or multilayer fabrics. The composite can be an aircraft window frame. The composite may be formed by impregnating and curing the woven preform in a matrix material.

The preforms of the invention can be woven using any convenient pattern for the warp fiber, i.e., ply-to-ply, through thickness angle interlock, orthogonal, etc. The preform can be woven using any conventional weave pattern, such as plain, twill, satin etc. While carbon fiber is preferred, the invention is applicable to practically any other fiber including but not limited to those that can be stretch broken, e.g. stretch broken carbon fiber, glass.

Potential applications for the woven preforms of the invention include any structural application that utilizes contoured frames with a stiffened leg, such as window frames in aircrafts, for example.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated and the accompanying drawings in which corresponding components are identified by the same reference numerals.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 1 is a schematic of an aircraft window frame;

FIG. 2 is a cross-sectional view of the aircraft window frame shown in FIG. 1 along line 2-2;

FIG. 4 is a schematic of an oval fabric produced using "steered" weaving, according to one aspect of the present invention;

FIG. 6 shows a step involved in forming a three dimensional woven preform, according to one aspect of the invention.

DETAILED DESCRIPTION OF THE PREFERRED EMBODIMENTS

Figures 3A, 3B:
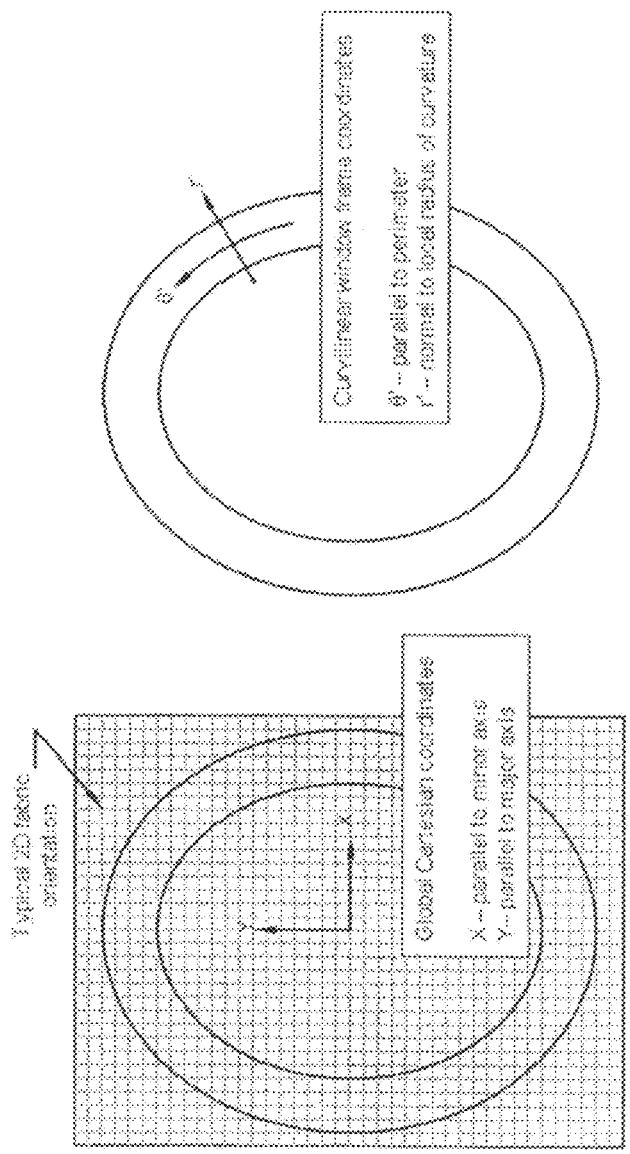
FIGS. 3(a) & 3(b) show schematics of an oval fabric in a conventional Cartesian coordinate system, and principal window frame coordinate system, respectively.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top," "bottom," "first," "second," and the like are words of convenience and are not to be construed as limiting terms.

Turning now to the figures, the invention according to one embodiment is a method of fabricating a three dimensional woven preform for use in high-strength applications, such as for example, aircraft window frames, composite turbine fan cases, jet engine containment rings, aircraft fuselage frames or in flanged rings for attaching nacelles to aircraft engines. Although the preferred embodiments described herein relate to an aircraft window frame, the present invention is not limited as such. For example, the woven preforms or methods described herein may be used in the manufacture of any of the structures listed above, or the like.

The method according to one exemplary embodiment uses a unique textile manufacturing technique, or what is known as "warp steering." The term "warp steering" refers to a differential take-up system for the warp yarns, which 'steers' them into a required shape, and allows straight weaving, polar weaving or a combination thereof to produce a preform that can practically take any shape in the X-Y plane of the fabric or preform. An example of such a warp steered oval fabric 30 produced using "steered" weaving, according to one aspect of the present invention, is shown in FIG. 3 where oval fabric 30 may be flat in one plane, and has a curved shape in the X-Y plane. In such an arrangement, each warp yarn or fiber 32 can have a different path length, similar to lines around a running track, while each weft yarn or fiber 34 is always perpendicular or orthogonal to the edges of the fabric. This is to say that in such a fabric, the warp fiber 32 may be continuous in the circumferential direction, and the weft fiber 34 is always oriented in the radial direction, relative to the local radius of curvature.

This technique may be used, according to one exemplary embodiment, to fabricate a composite window frame 10, such as that described with respect to FIG. 1, which includes features such as an upstanding leg 20 and an optional "joggle" 15. The method according to this embodiment uses two separately woven fabrics 22, 24, each of which has an un-darted portion 26 and a darted portion 28, such as that shown in FIG. 5(a), for example. One fabric 24 may be engineered to take the more-or-less planer oval shape of the main body of the window frame 10 without darting in that area. The other fabric 22 may be engineered to take the oval cone shape of the upstanding leg without darting. When the two fabrics 22, 24 are combined, the un-darted portion 26 of each fabric reinforces the darted portion 28 of the other, for example, as seen in FIG. 5(b). The resulting preform 35, such as that shown in FIG. 5(c), will have some continuous fiber in the circumferential and radial directions of all portions of the frame 10.

Figure 5C:
FIGS. 5(a)-(c) show steps involved in forming a three dimensional woven preform, according to one aspect of the invention.
Figure 5B:
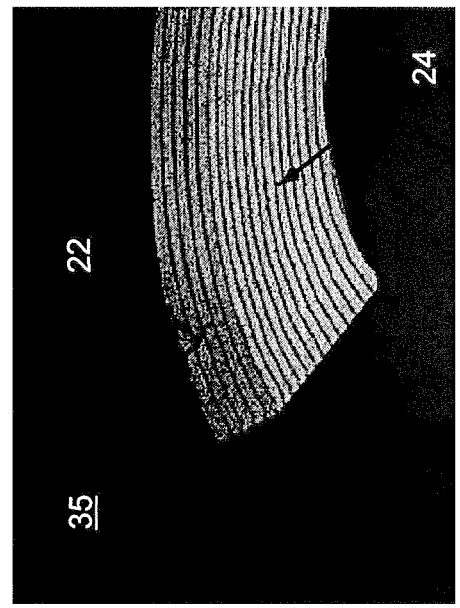
Figure 5A:
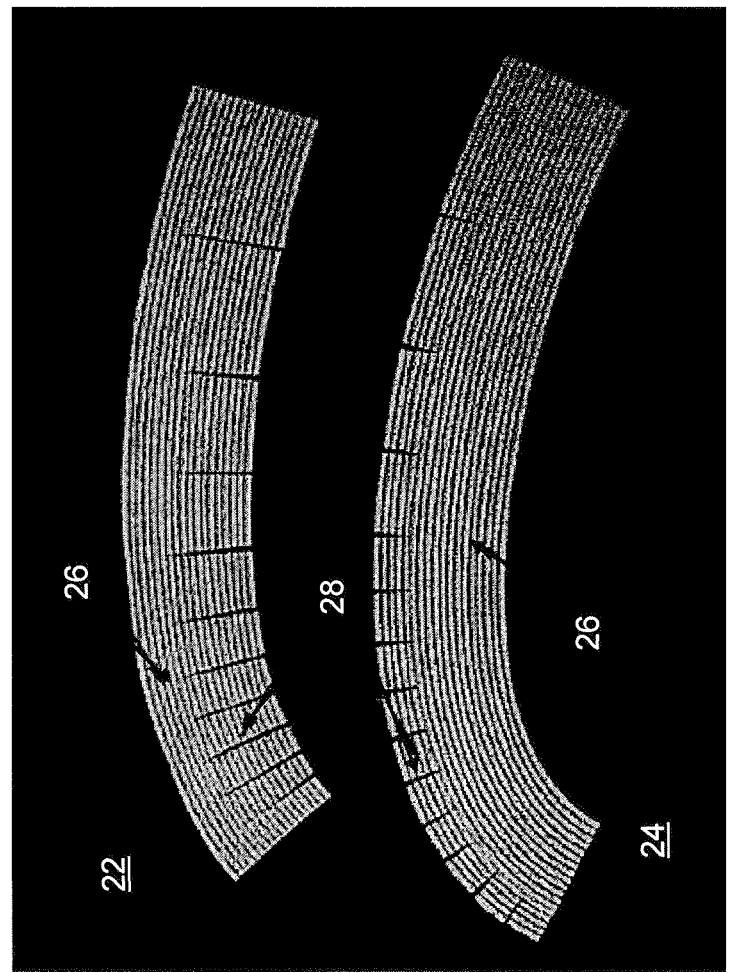

For the preform shown in FIG. 5(c), both fabrics 22, 24 can be woven to the full width of the frame 10. This produces a component with uniform thickness. It should, however, be obvious to one skilled in the art that either of these fabrics can be woven to include just an un-darted portion 26. In such a case, the portion of the window frame 10 that is constructed from the un-darted portion 26 of the full width fabric will not be as thick as the portion that is fabricated by combining the darted portion of the full width fabric and the partial width un-darted fabric.

The preform, according to this exemplary embodiment, can be single layered or multilayered. For example, multiple continuous layers of steered fabric 30 or 35 can be laid on top of one another to build up the desired thickness for a laminated preform 40, such as that shown in FIG. 6. Additional layers of fabric with fibers oriented in off-axis directions (relative to the local radius of curvature) can be interspersed between the layers of steered fabric if additional strength and/or stiffness are required. Alternatively, the steered fabric may be woven as a multilayer fabric where two or more layers of the multilayer fabric are integrally held by one or more warp and/or weft yarns in a desired pattern. The fabric can be woven using any convenient pattern for the warp fiber, i.e., ply-to-ply, through thickness angle interlock, orthogonal, etc. The fabric itself can be woven using any conventional weave pattern, such as plain, twill, satin etc. While carbon fiber is preferred, the invention may be applicable to practically any other fiber including but not limited to those that can be stretch broken. For example, stretch broken carbon fibers ("SBCF") can be used as circumferential fibers in selected regions of the preform, if needed.

Steered weaving according to this method can be carried out on a loom that uses a programmable differential take-up mechanism to produce the desired oval shape of the window frame. In the steered fabric 30, the warp fiber may be continuous in the circumferential direction and the weft fiber is always oriented in the radial direction, relative to the local radius of curvature.

Although it is presently envisioned that no additional tools are needed to conform or mold the fabric into the desired three dimensional shape, additional tools, such as for example a forming tool and/or compression device, may be used if necessary. After the fabric is molded to take the desired three dimensional shape, preform 35 can be processed into a composite using a conventional resin infusion method, such as resin transfer molding. For example, the preform according to one embodiment can be processed into an aircraft window frame 10 as shown in FIG. 1. The structure 10 comprises the woven preforms described in the previous embodiments.

The preforms of the present invention can be woven using any convenient pattern for the warp fiber, i.e., ply-to-ply, through thickness angle interlock, orthogonal, etc. While carbon fiber is preferred, the invention may be applicable to practically any other fiber type e.g., carbon, nylon, rayon, fiberglass, cotton, ceramic, aramid, polyester, and metal yarns or fibers.

The warp steered fabric of the invention may be made from materials, such as for example, carbon, nylon, rayon, polyester, fiberglass, cotton, glass, ceramic, aramid, and polyethylene, or any other material commonly known in the art. The final structure may be impregnated with a matrix material, such as for example, epoxy, bismaleimide, polyester, vinylester, ceramic, and carbon, using resin impregnation methods such as resin transfer molding or chemical vapor filtration, thereby forming a three dimensional composite structure.

Potential applications for the woven preform of the invention include any structural application that utilizes a contoured frame with a stiffened leg, although an aircraft window frame is described as an example herein.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A three dimensional woven preform comprising:
a plurality of warp steered fabrics,
wherein the warp steered fabrics comprise an un-darted portion and a darted portion, and wherein darted portions of said warp steered fabrics are joined to one another to provide continuous fabric in the circumferential and radial directions of all portions of said preform.

2. The preform of claim 1, wherein said preform is a portion of a window frame.

3. The preform of claim 1, said preform is a portion of an aircraft window frame.

4. The preform of claim 1, wherein a portion of said warp steered fabrics comprise conventional carbon fibers and/or stretch broken carbon fibers.

5. The preform of claim 1, wherein an un-darted portion in one steered fabric reinforces a darted portion in the other.

6. The preform of claim 1, further comprising one or more layers of fabric with fibers oriented in off-axis directions interspersed between the plurality of warp steered fabrics.

7. The preform of claim 1, wherein said warp steered fabrics are woven on a loom equipped with a differential take-up mechanism.

8. The preform of claim 1, wherein at least one warp steered fabric is a multilayer fabric.

9. The preform of claim 8, wherein a warp fiber pattern in said warp steered fabric is a pattern selected from the group consisting of ply-to-ply, orthogonal, and angle interlock.

10. The preform of claim 1, wherein said warp steered fabrics are formed by interweaving a plurality of warp and weft yarns or fibers, said warp and weft yarns or fibers being selected from the group consisting of carbon, SBCF, nylon, rayon, fiberglass, cotton, ceramic, aramid, polyester, and metal yarns or fibers.

11. A fiber reinforced composite comprising a three dimensional woven preform according to claim 1.

12. The composite of claim 11, further comprising a matrix material.

13. The composite of claim 12, wherein said matrix material is a resin, and said composite is formed from a process selected from the group consisting of resin transfer molding and chemical vapor infiltration.

14. The composite of claim 12, wherein said matrix material is selected from the group consisting of epoxy, bismaleimide, polyester, vinyl-ester, ceramic, and carbon.

* * * * *